United States Patent [19]

Masuda

[11] Patent Number: 4,921,063
[45] Date of Patent: May 1, 1990

[54] FAIL-SAFE CIRCUIT FOR CONSTANT SPEED DRIVE APPARATUS

[75] Inventor: Jiro Masuda, Kobe, Japan

[73] Assignee: Fujitsu Ten Limited, Kobe, Japan

[21] Appl. No.: 313,610

[22] Filed: Feb. 22, 1989

[30] Foreign Application Priority Data

Feb. 22, 1988 [JP] Japan .................. 63-40360

[51] Int. Cl.⁵ .......................................... B60K 31/02
[52] U.S. Cl. .................................. 180/178; 123/352
[58] Field of Search .............. 180/178, 179, 170, 171; 123/352, 198 B, 351; 324/170

[56] References Cited

U.S. PATENT DOCUMENTS 4,495,913  1/1985  Gray .................................. 180/179

Primary Examiner—Charles A. Marmor
Assistant Examiner—Richard Camby
Attorney, Agent, or Firm—Wenderoth, Lind & Ponack

[57] ABSTRACT

Fail-safe circuit for a constant speed drive apparatus which inhibit constant speed drive control when abnormality occurs in the constant speed drive apparatus. Thus trouble occurs in the fail-safe circuit itself, constant speed drive control is inhibited so that fail-safe operation can be positively performed. When the trouble occurs constant speed drive control is automatically inhibited. Thereby higher safety in the constant speed drive can be obtained.

8 Claims, 8 Drawing Sheets

FAIL-SAFE CIRCUIT FOR CONSTANT SPEED DRIVE APPARATUS

BACKGROUND OF THE INVENTION

1. Field of the Invention

This invention relates to fail-safe circuit for a constant speed drive apparatus for inhibiting a constant speed drive control when abnormal control or out of order of the constant speed drive apparatus is detected.

2. Description of the Prior Art

A constant speed drive apparatus is a mechanism which controls the opening degree of a throttle valve of an internal combustion engine to maintain a preset vehicle speed. The apparatus controls the throttle opening degree in an open-throttle direction when actual vehicle speed is lower than the set speed, thereby to increase the vehicle speed, and when actual vehicle speed is higher than the set speed, the apparatus controls the throttle opening degree in a closed throttle direction to lower the vehicle speed.

However, in the case where any abnormal condition of control exists such that the throttle valve is controlled in the open throttle direction despite the fact that actual vehicle speed is equivalent to or higher than the set speed or that constant speed drive control has been released, the vehicle speed is increased contrary to the driver's intention. Such condition is extremely dnagerous.

In order to avoid such danger, the constant speed drive apparatus are conventionally equipped with fail-safe circuit which monitor the signal level of a signal line for controlling the throttle valve.

FIG. 1 is a block diagram of a conventional constant speed drive apparatus equipped with fail-safe circuit. An actuator 71 for actuating a throttle valve of the internal combustion engine mounted in an automobile is constituted by a release valve 72, and a control valve 73. A processing circuit 74 implemented by a microcomputer or the like energizes the release valve 72 to communicate the atmosphere, and controls a duty ratio of the control valve 73, thereby utilizing a negative pressure of an intake manifold to control the opening degree of the throttle valve, the automobile being thus controlled for constant speed driving.

When the constant speed drive apparatus is energized by a power supply, a fail-safe circuit 75 outputs a high level signal through a signal line 113 to set switches SW11–SW13 to turning on. A low level output from an output terminal OUT14 of the processing circuit 74 is supplied to a base of a transistor TR16 through a gage G12 which is a non-inverting buffer, to turn on the transistor TR16. Accordingly an exciting current flows through the signal line 111 to energize the release valve 72. Signals for change to high and low levels for controlling the duty ratio are supplied from an output terminal OUT13 of the processing circuit 74 to a transistor TR15 through a non-inverting buffer gage G11. Whereby an energizing current flows in the control valve 73 through a signal line 112, the control valve 73 being thus controlled by the duty ratio.

The constant speed drive apparatus goes into a most dangerous condition when the control valve 73 is continuously energized with the result that the vehicle speed only tends to abruptly increase. In order to avoid such condition, a typical prior art apparatus for driving at the constant speed is provided with a fail-safe circuit 75 for constantly monitoring the signal level on the signal line 112 which actuates the control valve 73. Whereby when the fail-safe circuit 75 detects any abnormality with the signal level, the electric power form the power supply is cut off to the actuator 71 so as to prevent any abrupt increase in vehicle speed.

In FIG. 1, when the fail-safe circuit 75 receives the signal from the signal line 112 and a high level signal is supplied to the control valve 73 of the actuator 71 over a predetermined time, the fail-safe circuit 75 determines that an abnormal condition exists and accordingly outputs a low level signal to the signal line 113 to turn off the switches SW11–SW13 on one hand while, on the other hand, the fail-safe circuit 75 supplies a signal indicating the abnormal situation to the processing circuit 74 through a signal line 114. The release valve 72 is deenergized by the switches SW11–SW13 being turned off and, as a result, the release valve 72 is opened the atmosphere and the throttle valve is angularly displaced in the close throttle direction, the vehicle speed being then lowered. It may be noted in this apparatus that not all the switches SW11–SW13 are needed; there should be at least one of them.

With the above described prior art arrangement, in the case where the fail-safe circuit 75 itself is out of order abnormal signals leading out to the control valve 73 can not be detected. For example, when an emitter-collector short circuit should occurs in the transistor TR15, high level signals are outputted continuously to the signal line 112 and the control valve 73 is energized accordingly, with the result that the vehicle speed is abruptly increased. Such trouble is very dangerous and the condition would become further serious, and is coupled with any trouble in the constant speed drive apparatus. Another difficulty is that the constant speed drive apparatus has no function to detect whether the fail-safe circuit is out of order or not.

SUMMARY OF THE INVENTION

It is hence a primay object of this invention to provide a fail-safe circuit for a constant speed drive apparatus which can check to see whether the fail-safe circuit is in order or not and, if it is found that the fail-safe circuit is not properly functioning, operates to compulsorily inhibit constant speed drive control and give alarms to the driver.

To achieve the above object, this invention provides fail-safe circuit for a constant speed drive apparatus which comprises:

means in response to a throttle valve control signal for driving a throttle valve;

means for generating the throttle valve control signal to supply the throttle valve control signal to the throttle valve driving means to maintain a predetermined set vehicle speed;

means in response to the throttle valve control signal for detecting that the throttle valve control signal for controlling the throttle valve in an open throttle direction continues for more than a predetermined period of time, to generate a signal indicating abnormality with respect to the constant speed drive control; and means in response to the output signal from the abnormality detecting means for unabling the throttle valve driving means when the abnormality of the constant speed drive control is detected, and for causing the throttle valve to be in a close throttle direction; wherein the improvement comprises:

means for generating to supply to the abnormality detecting means a test mode signal which is equivalent to the continuance for more than the predetermined period of time of the throttle valve control signal for controlling the throttle valve in the open throttle direction, and means in response to the test mode signal for deciding whether or not the abnormality detecting means generates the signal indicating abnormality with respect to the constant speed drive control.

According to the invention, the test mode signal generating means supply to the abnormality detecting means a test mode signal equivalent to the continuance for more than the predetermined period of time of the control signal to control the throttle valve in the open throttle direction; and the deciding means check to see whether the abnormality detecting means should lead out an abnormality signal in response to the test mode signal, whereby decision is made whether the abnormality detecting means is in order or not. If the decision is that the abnormality detecting means is not properly functioning, the inactivating means inactivate the throttle valve drive means and the throttle valve is controlled in a close throttle direction.

As stated above, according to the invention, the operation of the abnormality detecting means is tested by giving a test mode signal as a simulated abnormality signal to the detecting means. Therefore, if the abnormality detecting means is out of order the trouble with it can be readily detected, it being thus possible to ensure improved safety of the constant speed drive.

In one preferred embodiment, means in response to the output of the deciding means for unabling the throttle valve driving means to drive the throttle valve when no signal indicating the abnormality is generated from the abnormality detecting means.

In another preferred embodiment, means in response to the output from the deciding means for generating an alarm indicating that the abnormality detecting means is out of order when no signal indicating the abnormality is generated from the abnormality detecting means.

In a further preferred embodiment, the test mode signal generating means is enabled immediately after the constant speed drive apparatus is powered on, and the deciding means permits constant speed drive control when deciding that the abnormality detecting means is order and prevents constant speed drive control when deciding that the abnormality detecting means is out of order.

In a still further preferred embodiment, the test mode signal generating means unables the throttle valve driving means, and supplies the test mode signal to the abnormality detecting means.

In a yet preferred embodiment, the test mode signal is derived from the test mode signal generating means through an output line other than an output line of the throttle valve control signal.

Preferably, in a preferred embodiment, the throttle valve driving means has a motor actuate the throttle valve in a close throttle direction when no signal indicating the abnormality is generated from the abnormality detecting means.

According to the invention, a fail-safe circuit for constant speed drive apparatus comprises:
(a) constant speed drive control system having;
(a1) means in response to a throttle valve control signal for actuating a throttle valve, and
(a2) means for generating the throttle valve control signal to supply the throttle control signal to the throttle valve driving means to maintain a predetermined set vehicle speed,
(b) means for monitoring the operation of the constant speed drive control system and for generating a signal indicating abnormality when the constant speed drive control system is out of order; and
(c) means in response to the output signal from the abnormality detecting means for unabling the throttle valve driving means when the abnormality of the constant speed drive control is detected to cause the throttle valve to be in a close throttle direction, wherein the improvement comprises:
(d) means for generating to supply to the abnormality detecting means a test mode signal which is equivalent to abnormality of the constant speed drive control system; and
(e) means for deciding whether or not the abnormality detecting means generates the signal indicating abnormality when the abnormality detecting means receives the test mode signal.

BRIEF DESCRIPTION OF THE DRAWINGS

These and other objects, features, and advantages of the invention will become further apparent from the following detailed description taken in conjunction with the accompanying drawings.

DETAILED DESCRIPTION OF THE PREFERRED EMBODIMENTS

Preferred embodiments of the invention will now be described in detail with reference to the accompanying drawings.

Figure 1:
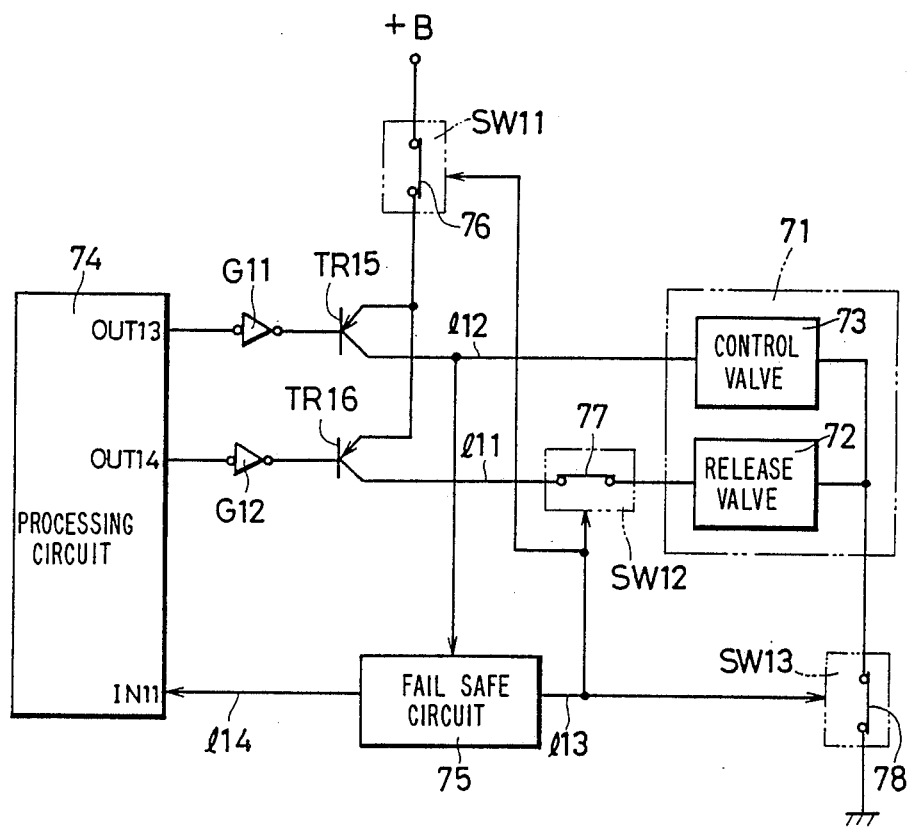
FIG. 1 is a block diagram showing a prior-art constant speed drive apparatus equipped with fail-safe means.
Figure 2:
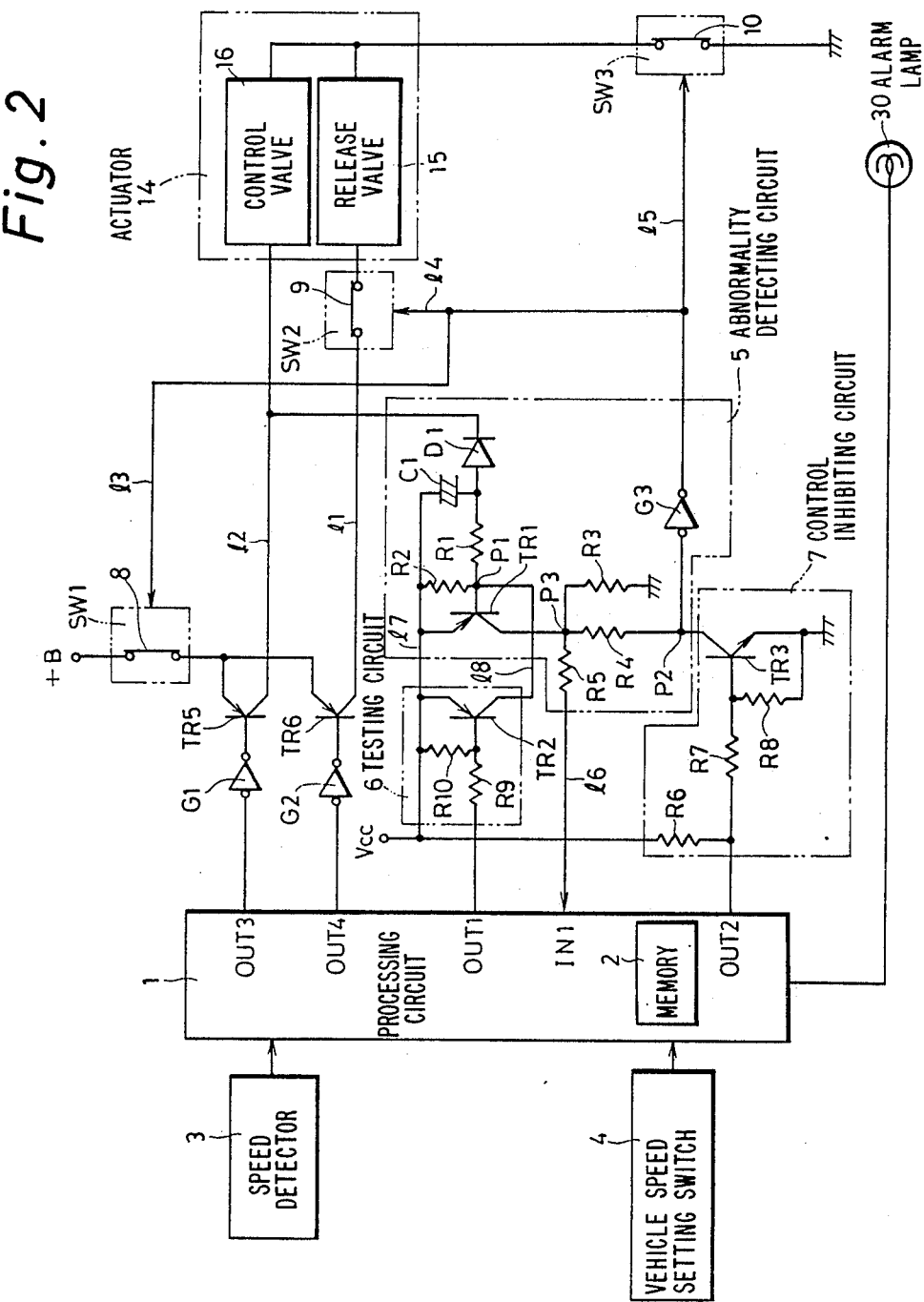
FIG. 2 is a block diagram showing a constant speed drive apparatus including fail-safe means representing one embodiment of the invention.
Figure 3:
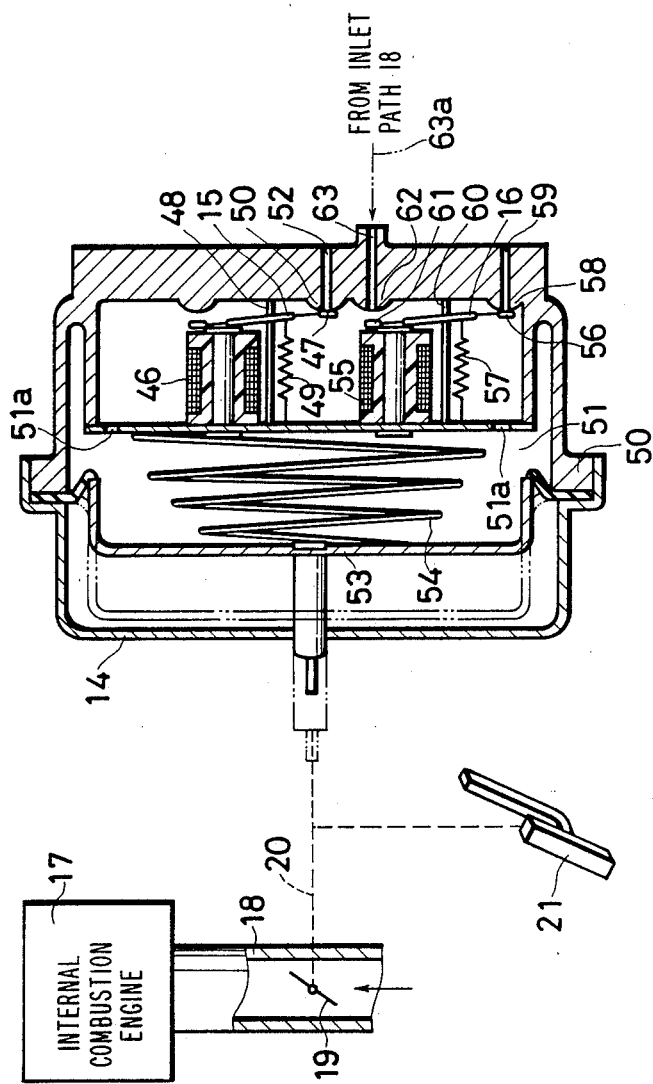
FIG. 3 is a sectional view showing the construction of an actuator 14 and associated parts.

FIG. 2 is a block diagram showing a constant speed drive apparatus with a fail-safe circuit of one embodiment according to the invention, and FIG. 3 is a sectional view showing the construction associated with an actuator 14 as throttle valve driving means.

A throttle valve 19 is disposed in an inlet path 18 of an internal combustion engine 17 which drives an automobile. The throttle valve 19 is controlled for its opening degree through a link mechanism 20 by the actuator 14 as throttle valve driving means which is provided for automatic controlling, and is also controlled for its opening degree corresponding to operation of an accelerator pedal 21.

A processing circuit 1 as throttle valve drive means is realized separate semiconductor elements or a microcomputer and has a memory 2 therein for vehicle speed setting. A vehicle speed signal from a speed detector 3 which detects actual vehicle speed is supplied to the processing circuit 1 and, when a vehicle speed setting switch 4 is turned on, the actual vehicle speed from the speed detector 3 is stored as a set vehicle speed in the memory 2. A alarm lamp 30 is provided associating with the processing circuit 1, and the alarm lamp 30 lights when abnormaly of the constant speed drive operation aftermentioned occurs.

In the actuator 14, one end of a solenoid 46 for acutuating a release valve 15 is connected to one end of a solenoid 55 for actuating a control valve 16, and both of other ends of the release valve 15 and the control valve 16 are grounded through a contact 10 of a switch SW3. An output signal from output terminal OUT4 of the processing circuit 1 is given to a base of a transistor TR6 through a gate G2 serving as a non-inverting buffer. A collector of the transistor TR6 is connected to the other end of the release valve solenoid 46 through contacts 9 of a switch SW2 to actuate the release valve 15. An output signal from output terminal OUT3 is supplied to a base of a transistor TR5 through a gate G1 serving as a non-inverting buffer. A collector of the transistor TR5 is connected to the other end of the control valve solenoid 55 to actuate the control valve 16. Emitters of the transistors TR5, TR6 are connected to a battery of the automobile through contacts of a switch SW1.

The gates G1, G2 output base current for actuating the transistors TR5, TR6. Switches SW1-SW3 are switching elements, which may realize switches having mechanical contacts or semiconductor switching elements, those switches SW1-SW3 are turned on when signal lines 13-15 are at high level, and are turned off when the signal lines 13-15 are at low level. It is noted that at lease one of the switches SW1-SW3 is required.

The solenoid 46 for the release valve 15 of the actuator 14 is deenergized when the transistor TR6 or switch SW2 is turned off. Therefore, a valve body 47 of the release valve 15 displaces pivotally at fulcrum 48 from a valve seat 50 by the biasing force of a spring 49 and spaces from the valve seat 50. Accordingly, a diaphragm chamber 51 of the actuator 14 which is constituted by a diaphragm 53 and a casing 50 is open to the atmosphere through a valve hole 52 and a penetrated hole 51a, and the diaphragm 53 remains biased by a spring 54.

The solenoid 55 for actuating the control valve 16 is controlled by changing duty ratio of exciting current responce to switching action of the transistor TR5. When the transistor TR5 is turned off so that the control valve solenoid 55 is unenergized, a valve body 56 of the control valve 16 is spaced from a valve seat 58 and accordingly a diaphragm chamber 51 is open to the atmosphere through the penetrated hole 51a and a valve hole 59. The control valve 16 is angularly displaceable about a fulcrum 60. When the valve body 56 is spaced from the valve seat 58, another valve body 61 is seated at a valve seat 62 and accordingly a valve hole 63 is shut off from the diaphragm chamber 51. The valve hole 63 is in communication with a portion of the inlet path 18 upstream of the throttle valve 19 through a negative pressure path 63 and is under negative pressure.

When the transistor TR5 conducts, the control valve solenoid 55 is excited. Accordingly, the control valve 16 appears as shown in FIG. 2, in which the valve body 56 is seated on the valve seat 58 while the valve body 61 is spaced from the valve seat 62, the diaphragm chamber 51 is under negative pressure. As the diaphragm chamber 51 is put under negative pressure, the diaphragm 53 is displaced rightward in FIG. 2 against the biasing force of the spring 54 so that the throttle valve 19 is controlled by the link mechanism 20 toward its wider open position.

When control signal on the signal line 12 continues to be at high level for more than a predetermined period of time, an abnormality detecting circuit 5, as abnormality detecting means, determines that an abnormal condition exists and accordingly it supplies to the processing circuit 1 through the signal line 16 a signal indicating that an abnormal condition exists in the constant speed drive control, and the abnormality detecting circuit 5 turn offthe switches SW1-SW3 through the gage G3. In the abnormality detecting circuit 5, a cathode of a diode D1 is connected to the signal line 12 and an anode thereof is connected to one end of a capacitor C1 and to one end of a resistor R1. The other end of the resistor R1 is connected, together with one end of a resistor R2, to the base of a transistor TR1. The respective other ends of the capacitor C1 and the resistor R2 are connected, together with an emitter of the transistor TR1, to power supply Vcc. The resistors R1, R2 and capacitor C1 constitute an integration circuit in which charge and discharge are repeated through the diode D1. When the signal line 12 is at low level, the charge in the capacitor C1 is discharged through the diode D1, control valve solenoid 55, and contacts of the switch SW3. When the signal line 12 is at high level, the integration circuit is charged by the power supply Vcc through the resistors R2, R1. Therefore, when a transistor TR2 of a testing circuit 6 is in its turning off position, the potential at a connection point P1 is determined by the duty ratio of signal on the signal line 12.

Resistors R3, R4, R5 are connected at one end to the collector of the transistor TR1, the other end of the resistor R3 begin grounded. The other end of the resistor R4 is connected to an input of gage G3 as a non-inverting buffer and also to a collector of a transistor TR3 in a control inhibiting circuit 7 as inactivating means. The other end of the resistor R5 is connected to an input terminal IN1 of the processing circuit 1 through the signal line 16.

The gage G3 is a gate which outputs signals for controlling so as to turn on/off switches SW1-SW3. When a high level signal is supplied to the switch SW1 through signal line 13, the contacts 8 of the switch SW1 turn on. When a low level signal is supplied to the switch SW1, the contacts 8 are turned off. Same applies to the other switches SW2, SW3. When supplied a high level signal, they conduct, while they are turned off when supplied a low level signal. The switches SW1-SW3 are utilized for compulsorily releasing the constant speed drive control. While the constant speed drive apparatus is in normal operation, the switches SW1-SW3 are supplied with high level signals and are in turning on.

Figure 4:
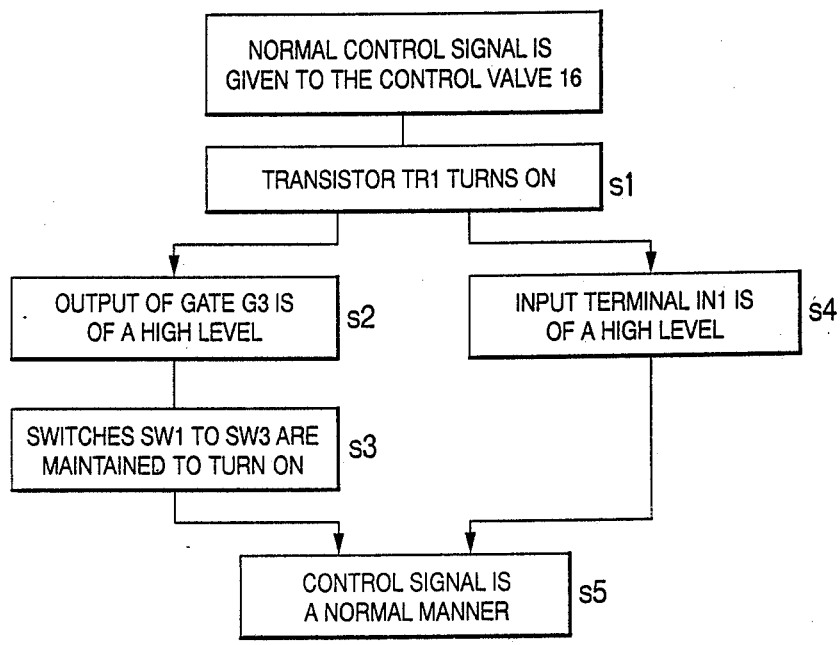
FIG. 4 is a flow chart for illustrating of the manner of operation of an abnormality detecting circuit 5 when duty control of a control valve 16 is being normally performed.

Nextly, the operation for detecting the abnormality by the abnormality detecting circuit 5 will be explained. Referring first to FIG. 4, a normal control signal is made on the signal line 12, that is, a high level signal is in continuation for less than a predetermined period of time. FIG. 4 is a flow chart illustrative of operation of the abnormality detecting circuit 5 in the case where duty control is normally performed by the control valve 16. The resistors R1, R2 and the capacitor C1 constitute an integration circuit in which cycles of charge and discharge are repeated through the diode D1. Therefore, when the duty ratio of signal on the signal line 12 is low, the potential at the connection point P1 is lower than that on a supply line 17. Accordingly, the transistor TR1 is turned on (step s1) and thus the potential at the connection point P3 is now of about same order as that on the supply line 17. Therefore, the output of the gate G3 is also of a high level (step s2) and the switches SW1–SW3 are maintained to be turned on (step s3). Since the connection point P3 is of a high level, a high level signal is inputted to the input terminal IN1 of the processing circuit 1 (step s4). Because of the fact that the input terminal IN1 is of a high level, the processing circuit 1 determines that control signal to the control valve 16 of the constant speed drive apparatus is a normal manner (step s5).

Figure 5:
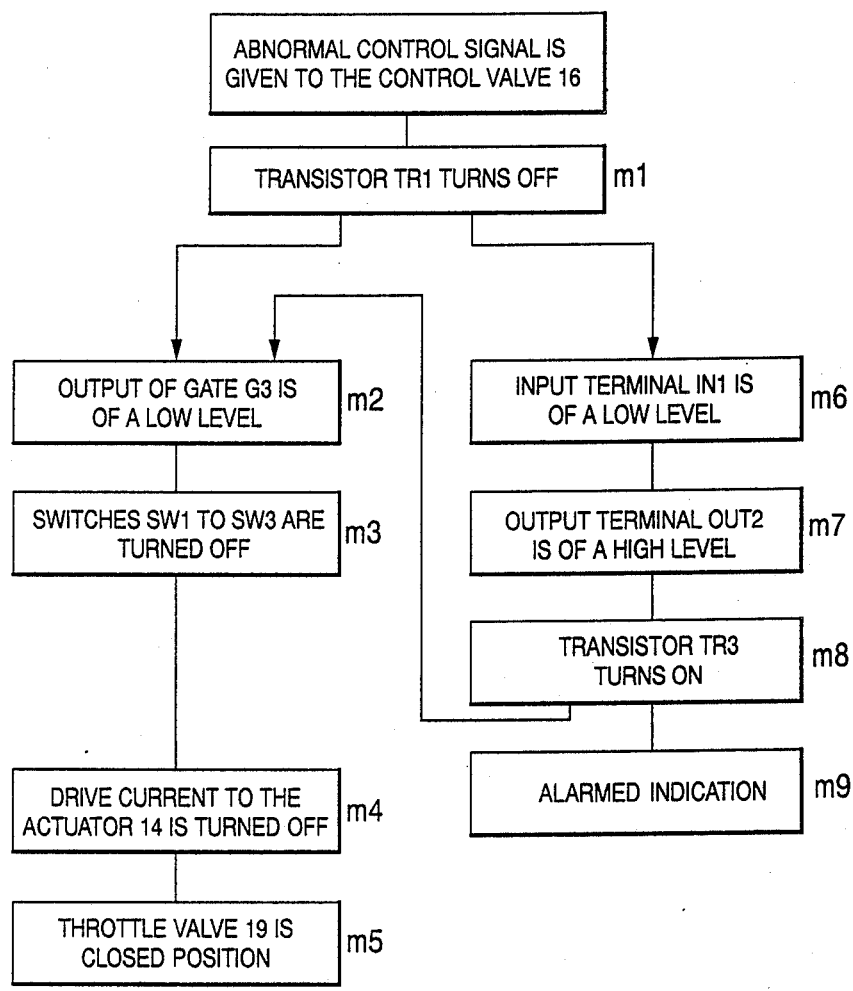
FIG. 5 is a flow chart for illustrating of the manner of operation of the abnormality detecting circuit 5 when an abnormal control signal is supplied to the control valve 16.

Nextly, the operation of the abnormality detecting circuit 5 in the case where an abnormal control signal is detected will be explained with reference to FIG. 5. FIG. 5 is a flow chart illustrative of operation of the abnormality detecting circuit 5 in the case where the abnormal control signal is given to the control valve 16. Where high level signal on the signal line 12 is in continuation for more than the predetermined period of time, the capacitor C1 is discharged through the supply line 17 and resistors R2, R1. Accordingly, the potential at the connection point P1 is increased. When the potential at the connection point P1 has reached a level comparable to the potential of the supply line 17, the transistor TR1 turns off (step m1) and the potential at the connection point P2 is reduced to about ground level through the resistors R3, R4. Accordingly, the output of the gage G3 is reduced to a low level (step m2) and the switches SW1–SW3 are turned off (step m3), and thus the drive current to be supplied to the release valve solenoid 46 and the control valve solenoid 55 is cut off (step m4). As the release valve solenoid 46 is deenergized, the diaphragm chamber 51 is opened to the atmosphere through the valve hole 52, and the throttle valve 19 is angularly displaced toward its closed position (step m5).

When the transistor TR1 is turned off, the potential of the signal line 16 is reduced to a low level through the resistors R3, R5 (step m6). Where the input terminal IN1 is of a low level, the processing circuit 1 determines that an abnormal control signal is supplied to the signal line 12. When an abnormality signal is received in the input terminal IN1 of the processing circuit 1 as deciding means, the processing circuit 1 outputs a signal for inhibiting constant speed drive control to the control inhibiting circuit 7 through its output terminal OUT2 (step m7).

The output terminal OUT2 is connected to one end of each of resistors R6, R7. The other end of the resistor R6 is connected to the base of the transistor TR3 and also to a resistor R8. The resistor R8 is connected to a point between the base and emitter of the transistor TR3. The transistor TR3 has its emitter grounded and its collector connected to the input of the gate G3 of the abnormality detecting circuit 5.

Therefore, when the processing circuit 1 determines that abnormal control signal is led out on the signal line 12 and outputs a high level signal through its output terminal OUT2, the transistor TR3 is turned on (step m8). As a consequence, the potential at the connection point P2 is reduced to a low level and the output of the gate G3 is also reduced to a low level (step m2). Accordingly, a low level signal is given to the switches SW1–SW3 and contacts 8–10 are turned off (step m3). Upon entry from the abnormality detecting circuit 5 of a signal indicative of an abnormal condition, the processing circuit 1 lights on the alarm lamp 30 and issues an alarmed indication to warn the driver of the abnormality (step m9).

Figure 6:
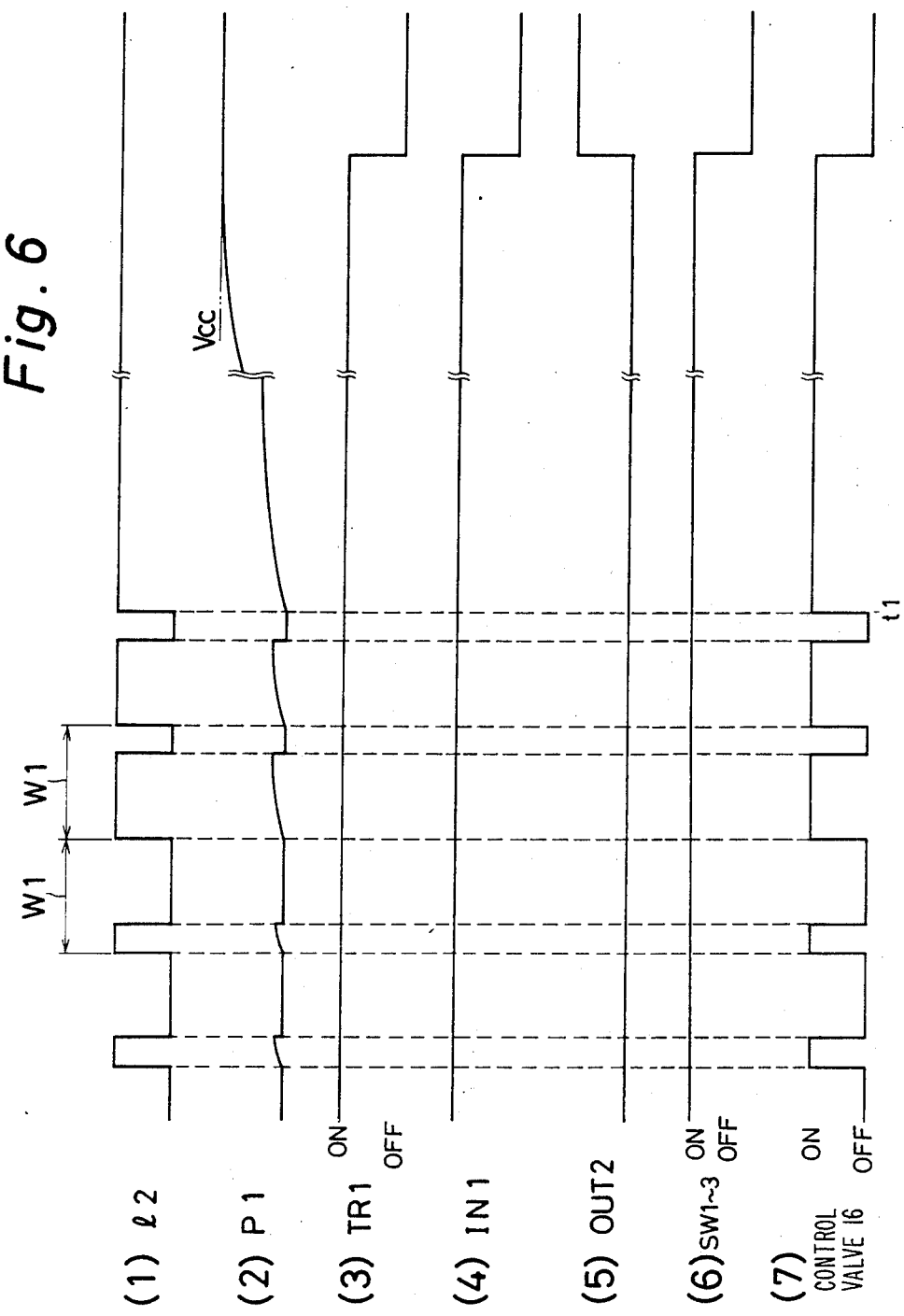
FIG. 6 is a wave-form diagram for illustration of constant speed drive operation.

To summarize the above described process, when the constant-speed drive apparatus is in normal operation, pulses of determined duty ratio corresponding to difference between the set speed and the actual speed are outputted from the output terminal OUT3 of the processing circuit 1 and accordingly a throttle valve drive signal, as shown in FIG. 6(1), is supplied to the signal line 12 which the signal is then inputted to the control valve 16. Thereon, the diode D1 performs turning on/off operation is response to the pulses supplied to the line 12. Thus charging and discharging of the capacitor C1, the potential at the connection point P1 varies as FIG. 6(2) shows.

When the constant speed drive apparatus is in normal condition or is in order, the transistor TR1 is in conduction as FIG. 6(3) shows. Because of the fact that the transistor TR1 is in turning on, the connection point P3 is at high level and accordingly a high level input is given to the input terminal IN1 as FIG. 6(4) shows. Therefore, a low level output is led out from the output terminal OUT2 of the processing circuit 1 as FIG. 6(5) shows. Accordingly, the transistor TR3 is turned off and a high level input is supplied to the gate G3; and as FIG. 6(6) shows, the switches SW1–SW3 are turned on. Thus, as FIG. 6(7) shows, the control valve 16 is duty controlled by pulses produced at predetermined intervals W1.

In contrast, at the time of t1 when an abnormal condition or out of order occurs as a result of shortcircuiting of the transistor TR5 or otherwise, the line 12 is maintained at a high level condition of 100% duty ratio as FIG. 6(1) shows. Therefore, the diode D1 remains in turning off and the accumulated charge in the capacitor C1 is consumed at the resistors R1, R2; and thus the potential at the connection point P1 approaches the supply voltage Vcc as FIG. 6(2) shows.

As the potential at the connection point P1 steps up, the transistor TR1 is turned off as FIG. 6(3) shows. Accordingly, the potential at the connection point P3 is reduced to a low level and, as FIG. 6(4) shows, the input terminal IN1 of the processing circuit becomes into a low level condition; thus, as FIG. 6(5) shows, the output terminal OUT2 becomes into a low level condition. Therefore, as FIG. 6(6) shows, the switches SW1–SW3 are turned off and, as FIG. 6(7) shows, the control valve 16 causes the diaphragm chamber 51 to communicate with the atmosphere.

The testing circuit 6 is a circuit for deciding whether or not that the transistor TR3 of the abnormality detecting circuit 5 operates normaly. The abnormality detecting circuit 5 can not detect an abnormal control signal in the signal line 12, moreover becomes a dangerous state by shorting between the emitter and the collector of the transistor TR1. The reasons are as following. In the state disconnected on the input part of the abnormality detecting means 5 as e.g. the diode D1, the base of the transistor TR1 becomes high level by discharging continuously from the capacitor C1, accordingly the transistor turns off. Consequently, the potential at the connection point P2 is reduced to a low level and accordingly the output of the gate G3 becomes into a low level condition to turn off the switches SW1-SW3. Thus constant speed drive control is inhibited, there being no possibility of danger. Similarly, where the emitter-collector of the transistor TR1 is turned off the potential at the connection point P2 is at low level and switches SW1-SW3 are cut off, there being thus no possibility of danger.

However, when shortcircuiting accurs between the emitter and the collector in the transistor TR1, in case of which the abnormal control signal is output into signal line 12,the transistor TR1 is not turned off and the connection point P2 is constantly held at high level; accordingly the switches SW1-SW3 remain to turned on. Thereon, the testing circuit 6 detects whether or not a shorted circuit exists between the emitter and the collector in the transistor TR1 to determine whether or not the abnormality detecting circuit 5 is in normal operation.

The processing circuit 1, as a test mode signal generating means, has its output terminal OUT1 connected to one end of a resistor R9. The other end of the resistor R9 is connected to one end of a resistor R10 and also to the base of the transistor TR2. The other end of the resistor R10 and the emitter of the transistor TR2 are both connected to power supply Vcc through supply line 17. The collector of the transistor TR2 is connected to the base of the transistor TR1 in the abnormality detecting circuit 5. The manner of test operation for the transistor TR1 will be explained with reference to the FIG. 7 flow chart.

Figure 7:
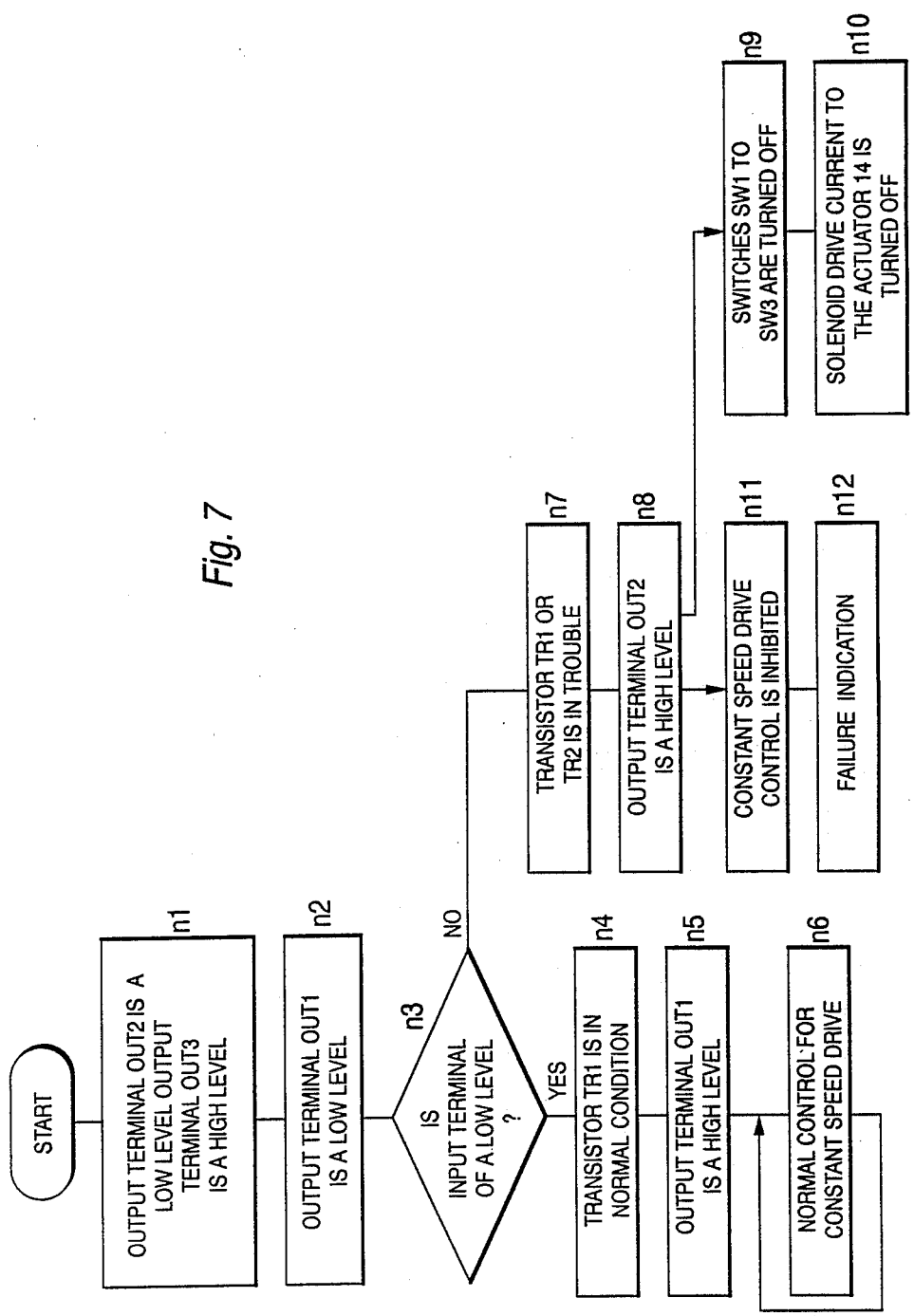
FIG. 7 is a flow chart for illustrating the operation of a processing circuit 1 for testing a transistor TRI of the abnormality detecting circuit 5.

FIG. 7 is a flow chart for illustrating test operation with respect to the transistor TR1 in the abnormality detecting circuit 5. Testing of the abnormality detecting circuit 5 is made when, for example, power is inputted to the constant speed drive apparatus. At step n1, the processing circuit 1 outputs a low level signal from its output terminal OUT2 to turn off the transistor TR3. The processing circuit 1 also outputs a high level signal from its output terminal OUT3 to turn off the transistor TR5. Consequently, the signal line 12 becomes into a low level condition. Accordingly, safety is accomplished as the control valve 16 does not operate when the abnormality detecting circuit 5 is tested.

Nextly, at step n2, the processing circuit 1 outputs a low level signal from its output terminal OUT1. As a result, the transistor TR2 turns on and the potential of the collector of the transistor TR2 steps up to a high level. Consequently, the testing circuit 6 supplies a test mode signal to the abnormality detecting circuit 5 through the signal line 18. The test mode signal is a simulated signal given to the abnormality detecting circuit 5 which is equivalent to an abnormality control signal given to the control valve 16.

As the test mode signal is given to the abnormality detecting circuit 5, the potential at the base of the transitor TR1 goes up to a high level. Since the base potential goes up to a high level, if the transistor TR1 is in normal condition, the transitor TR1 turns off and the potential at the connection point P3 is reduced to a low level. However, a short circuit exists between the emitter and the collector in the transistor TR1, the collector potential of the transistor TR1 is always of a high level. By making a decision at step n3 as to whether the potential of the input terminal IN1 is of a high level or a low level, the processing circuit 1 can determine whether the transistor TR1 is in order or not. That is, if the input terminal IN1 is in a low level state, the processing program advances from step n3 to step n4 to determine that the transistor TR1 is in normal condition.

Then, the processing circuit 1 goes to step n5, at which step it outputs a high level signal from its output terminal OUT1 to turn off the transistor TR2 in order to stop test mode signal outputting. Testing by the testing circuit 6 is thus terminated. Upon completion of the processing at step n5, the processing circuit 1 advances to step n6 to be able to normal control for constant speed drive. That is, operation of the constant speed drive is started from the time of which the vehicle speed setting switch 4 is operated.

At step n3, when the input terminal is of a high level condition, the processing circuit 1 advances to step n7, at which step it is determined that the transistor TR1 or TR2 is out of order. There are two cases in which a high level condition is caused to the input terminal IN1 of the processing circuit 1. One case is that a short circuit is present between the emitter and the collector in the transistor TR1 so that the potential of the supply line 17 is present at the connection point P3. The other case is that an turning off condition is present between the emitter and the collector in the transistor TR2, in which case since the signal line 12 is of a low level, the transistor TR1 is in turning on condition and accordingly the potential of the supply line 17 is present at the connection point P3. In this embodiment, not only is it possible to detect troubles due to shortcircuiting between the emitter and the collector in the transistor TR1 of the abnormality detecting circuit 5, but also it is possible to detect troubles due to the emitter-collector turning off condition in the transistor TR2 of the testing circuit 6. Table 1 shows criteria for normality-abnormality decision.

TABLE 1

| Terminals in processing circuit 1 | Test modes | |
|---|---|---|
| OUT 1 | L | L |
| OUT 3 | H | H |
| IN 1 | L | H |
| Decision | Normal | Abnormal (transistor TR1 shorts or transistor TR2 turns off) |

When, at step 7, the processing circuit 1 determines that the transistor TR1 or TR2 is in trouble, it poceeds to step n8, at which it outputs a high level signal from its output terminal OUT2 to turn on the transistor TR3. Consequently, the potential at the connection point P2 is reduced to low level and the output of the gate G3 is also brought to a low level condition. At step n9, therefore, the switches SW1-SW3 are turned off. Since the switches SW1-SW3 are turned off at step n9, the solenoid drive current for actuating the actuator 14 is turned off at step n10. The processing circuit 1 determines when the transistor TR1 or TR2 is in trouble, it inhibites constant speed drive control at step n11. That is, output of the vehicle speed setting switch 4 is not inputted in the processing circuit 1. At step n12, the processing circuit 1 gives a failure indication by the alarm lamp 30 and alarms the driver accordingly. The alarm in this case may be given by acoustic or optical means.

Figure 8:
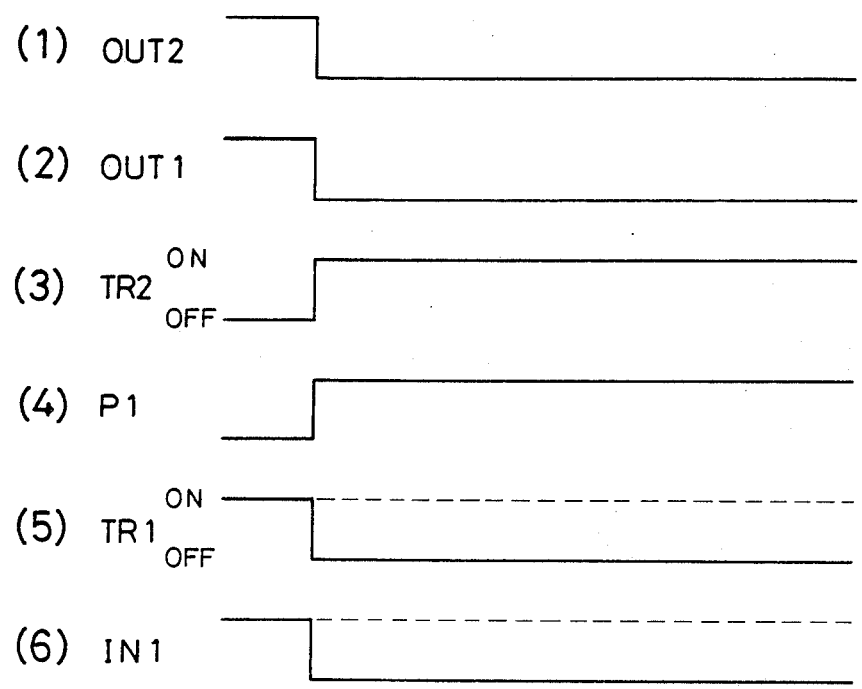
FIG. 8 is a wave-form diagram explanatory of the testing operation for the transistor TRI.

In the above described failure detecting operation, as FIG. 8(1) shows, a low level output is led out from the output terminal OUT2 of the processing circuit to turn off the transistor TR3, and as FIG. 8(2) shows, a low level output is also led out from the output terminal OUT1, the transistor TR2 being thus put in conduction as FIG. 8(3) shows. Accordingly, the connection point P1 is brought to a high level condition through line 18 as FIG. 8(4). Thus it is possible to step up the base of the transistor TR1 to a high level as in the case where an abnormal condition is present.

Then the transistor TR1 is in order, the transistor TR1 is turned off as shown by solid line in FIG. 8(5), and the input terminal IN1 of the processing circuit 1 is brought to a low level as shown by solid line in FIG. 8(6). Further, in the case of which a short circuit is present in the transistor TR1, the transistor TR1 remains at a high level as shown by broken line in FIG. 8(5) and likewise the input terminal IN1 remains at a high level as shown by broken line in FIG. 8(6).

As above described, according to the embodiment, it is possible to test the abnormality detecting circuit 5 to check for possible failing at an early stage, and even though a trouble is present, constant speed drive control is inhibited. Therefore, it is possible to assure much higher safety of the constant speed drive apparatus.

In the above described embodiment, the actuator 14 is designed to actuate the throttle valve 19 by utilization of negative pressure due to suction; but alternatively, the throttle valve 19 may be actuated by a motor.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. Fail-safe circuit for constant speed drive apparatus which comprises:
    means in response to a throttle valve control signal for driving a throttle valve:
    means for generating the throttle valve control signal to supply the throttle valve control signal to the throttle valve driving means to maintain a predetermined set vehicle speed:
    means for generating a signal indicating abnormality with respect to the constant speed drive control when the throttle valve control signal for controlling the throttle valve in an open throttle direction continues for more than a predetermined period of time,
    means in response to the output signal from the abnormality detecting means for disabling the throttle valve driving means when the abnormality of the constant speed drive control is detected, and for causing the throttle valve to move in a close throttle direction; wherein the improvement comprises:
    means for generating a test mode signal which is equivalent to the throttle valve control signal for controlling the throttle valve in the open throttle direction continuing for more than a predetermined period of time and
    means in response to the test mode signal for deciding whether or not the abnormality detecting means generated the signal indicating abnormality with respect to the constant speed drive control.

2. Fail-safe circuit for constant speed drive apparatus as recited in claim 1, further comprising:
    means in response to the output of the deciding means for disabling the throttle valve driving means to drive the throttle valve when no signal indicating the abnormality is generated from the abnormality detecting means.

3. Fail-safe circuit for constant speed drive apparatus as recited in claim 1, further comprising:
    means in response to the output from the deciding means for generating an alarm indicating that the abnormality detecting means is out of order when no signal indicating the abnormality is generated from the abnormality-detecting means.

4. Fail-safe circuit for constant speed drive apparatus as recited in claim 1, wherein
    the test mode signal generating means is enabled immediately after the constant speed drive apparatus is powered on, and
    the deciding means permits constant speed drive control when deciding that the abnormality detecting means is order and prevents constant speed drive control when deciding that the abnormality detecting means is out of order.

5. Fail-safe circuit for constant speed drive apparatus as recited in claim 1, wherein the test mode signal generating means disables the throttle valve driving means, and supplies the test mode signal to the abnormality detecting means.

6. Fail-safe circuit for constant speed drive apparatus as recited in claim 1, wherein the test mode signal is derived from the test mode signal generating means through an output line other than an output line of the throttle valve control signal.

7. Fail-safe circuit for constant speed drive apparatus as recited in claim 1, wherein the throttle valve driving means has a motor disables the throttle valve in a close throttle direction when no signal indicating the abnormality is generated from the abnormality detecting means.

8. Fail-safe circuit for constant speed drive apparatus which comprises:
    (a) constant speed drive control system having;
        (a1) means in response to a throttle valve control signal for actuating a throttle valve, and
        (a2) means for generating the throttle valve control signal to supply the throttle control signal to the throttle valve driving means to maintain a predetermined set vehicle speed,
    (b) means for monitoring the operation of the constant speed drive control system and for generating a signal indicating abnormality when the constant speed drive control system is out of order; and
    (c) means in response to the output signal from the abnormality detecting means for disabling the throttle valve driving means when the abnormality of the constant speed drive control is detected to cause the throttle valve to move in a close throttle direction, wherein the improvement comprises:
    (d) means for generating a test mode signal which is equivalent to the signal indicating abnormality of the constant speed drive control system; and
    (e) means for deciding whether or not the abnormality detecting means generated the signal indicating abormality when the abnormality detecting means receives the test mode signal.

* * * * *